Figure 1:
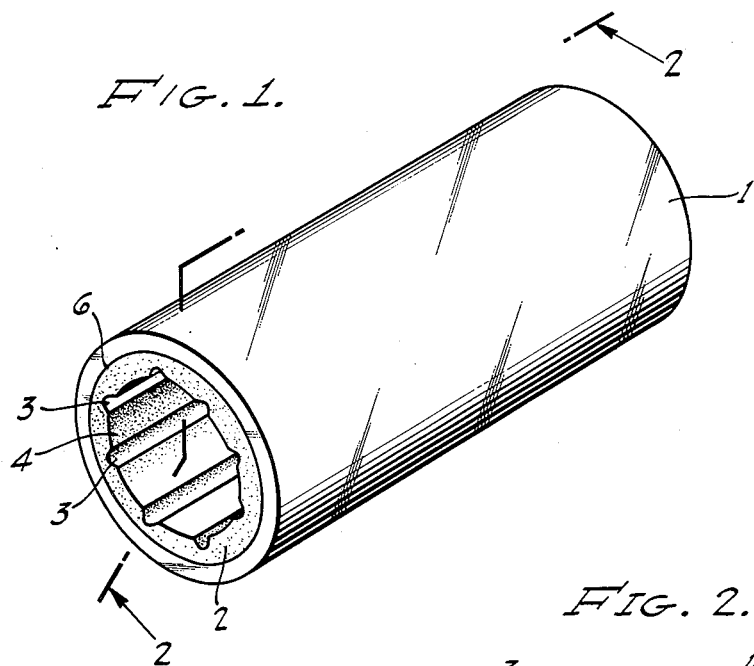

Feb. 27, 1962  R. B. KIRK  3,023,059
MARINE BEARING
Filed Aug. 16, 1957

ROBERT B. KIRK
INVENTOR.

BY Allen E. Hambley
ATTORNEY

United States Patent Office 3,023,059
Patented Feb. 27, 1962

1

3,023,059
MARINE BEARING
Robert B. Kirk, Los Angeles, Calif., assignor to Borg-Warner Corporation, Chicago, Ill., a corporation of Illinois
Filed Aug. 16, 1957, Ser. No. 678,725
2 Claims. (Cl. 308—238)

The present invention relates to bearings, and more particularly, to an improved marine bearing for use in rotatably supporting the propeller shaft of boats and the like.

Heretofore, rubber bearings have been employed for rotatably supporting the propeller shaft of power-driven boats, such rubber bearings having certain distinct advantages over ordinary brass bearings. Among these advantages are the facts that the rubber, being resilient, yields to any abrasive particles which may work between the shaft and the bearing, thus absorbing abrasive pressure and protecting the metallic shaft, in that the abrasive particles are rolled across the bearing surfaces and are not held tightly between the shaft and the bearing; and the resilient rubber bearings compensate for a certain degree of shaft deflection and provide a cushion against noise and vibration which is transmitted through the bearings of other materials, such as brass.

Heretofore, such rubber bearings have been provided by molding in an outer brass sleeve a rubber liner, preferably having longitudinally extended inner peripheral grooves to enable the circulation of water through the rubber bearing surfaces, thus to flush out any abrasive materials and lubricate the bearing. One notable disadvantage in the use of a brass sleeve in conjunction with the rubber bearing inner liner is the fact that the brass sleeve frequently becomes bound in the metallic bearing strut or housing as the result of rusting, corrosion, and the like, this being particularly true when the boat is used in salt water. Another disadvantage attending the use of a brass bearing sleeve is that such a sleeve permits an electrolytic action, which is particularly undesirable in the case of metallic-hull boats. It has been known, even in the case of wooden boats, for the heads of screws to be virtually eaten away by electrolysis set up between the conventional brass bearings and any metal parts disposed under the water line.

Accordingly, an object of the present invention is to provide a bearing particularly adapted for use in marine installations, such as for rotatably supporting the propeller shaft of power-driven boats, which bearing is entirely composed of non-conductive materials, thus eliminating any electrolytic action.

Another object is to provide a bearing as aforementioned, which is composed of materials which will not oxidize and will not become bound in a bearing housing by virtue of rust, corrosion, or the like.

Still another object of the invention is to provide a bearing of the type aforesaid, which is comparatively light, this being a factor in that it enables substantial reduction in shipping costs and ultimate potential savings to a consumer.

Still another object is to provide a marine bearing as aforesaid, comprising a non-metallic supporting sleeve composed of a plastic material which is reinforced with a non-metallic material, such as fiberglass, and a resilient non-conductive bearing section concentrically mounted with relation to the supporting sleeve.

Heretofore, in the manufacture of rubber bearings carried by a brass or other metallic sleeve, the rubber has been mounted in or on the brass sleeve and bonded thereto as by a cement. Obviously, the effectiveness of a rubber-to-metal bond is limited, inasmuch as the metal bonding surface is substantially smooth, it being impractical and uneconomical to roughen such surface or otherwise provide means for effecting a mechanical bond.

Another object of the present invention, therefore, is to provide a bearing structure wherein the rubber bearing material is mechanically bonded to the supporting sleeve. Such a mechanical bond is effected, when employing a fiberglass reinforced plastic sleeve, during pressure molding of the rubber bearing material into or on the sleeve, since, under pressure, a portion of the rubber material will be, to some extent, forced into the interstices of the fiberglass reinforcing fabric. Moreover, in employing a chemical bonding agent of the type ordinarily employed in the manufacture of composite brass and rubber bearings, the bonding material, during pressure molding of the rubber in a fiberglass reinforced supporting sleeve, will also be forced into the fabric, thus providing a substantial increase in the effective bonding area covered by the bonding material as distinguished from those structures where the bonding material is effective only on a true cylindrical surface.

Other objects and advantages of the invention will be hereinafter described or will become apparent to those skilled in the art to which the invention appertains, and the novel features thereof will be defined in the appended claims.

Figure 2:
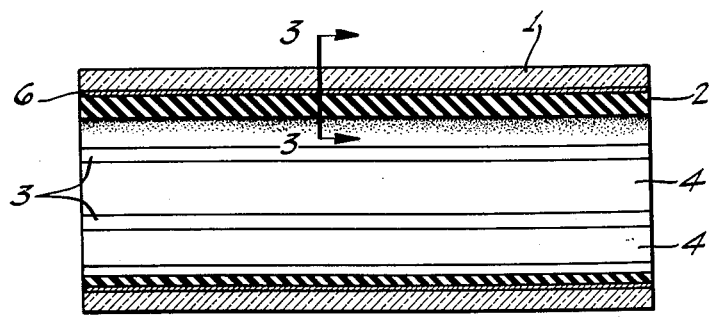
Figure 3:
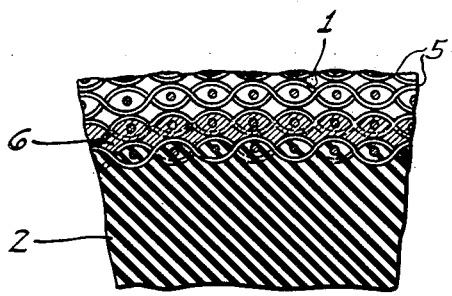

In the accompanying drawings:
FIG. 1 is a view in perspective of a non-metallic bearing made in accordance with the invention;
FIG. 2 is a view in longitudinal section as taken on the line 2—2 of FIG. 1; and
FIG. 3 is an enlarged fragmentary detailed view in section as taken on the line 3—3 of FIG. 2.

Like reference characters in the several views of the drawings and in the following detailed description designate corresponding parts.

The bearing hereof generally comprises a cylindrical supporting sleeve or shell 1, and disposed in concentric relation thereto, a resilient bearing sleeve 2. In the illustrative form the bearing is so constructed as to be fixed in a bearing strut or housing of a boat while a propeller shaft rotates therein, although it is to be understood that the relationship of these parts may be reversed so that the resilient bearing sleeve is disposed externally of the supporting sleeve, the bearing assembly thus constituting a so-called rotary bearing adapted to be fixed upon a shaft to rotate therewith.

Preferably, the resilient bearing sleeve 2 is provided with a series of longitudinally extended grooves 3 and lands 4, whereby, when in use, water will pass through the grooves 3 for the purposes of flushing abrasive material from the bearing and washing over the lands so as to effectively water-lubricate the bearing as is customary.

In accordance with the salient features of the invention, the supporting sleeve 1 of the invention is composed of a molded non-conductive plastic material such as a phenolic resin or the like, such molded body being reinforced with fiberglass fabric as is best seen in FIG. 3 and designated generally at 5. The fabric is wrapped so as to provide a multiple ply formation which is impregnated with the phenolic material and molded to a cylindrical form. Such a product is available in commerce and is widely used as a conduit. This fiberglass reinforced phenolic tubing material is noted for its ability to withstand severe surface conditions without deleterious effects. Moreover, the material is non-conductive.

The concept of the present invention stems from the recognition of the fact that a fiberglass and phenolic resin sleeve can withstand the punishment to which a marine propeller shaft bearing is subjected, while, at the same time, affording certain substantial advantages in the art. One of the advantages is that by virtue of this plastic and fiberglass material being non-conductive, a non-conductive rubber or synthetic rubber bearing surface can be employed with the outer sleeve 1, thus resulting in a structure which would not create an electrolytic action with any surrounding submerged metallic parts of a boat. Moreover, this supporting sleeve material will not rust or corrode, thus becoming substantially lodged in a bearing housing.

Another important advantage of the use of this sleeve is derived from the fact that in molding of the rubber or synthetic rubber bearing sleeve section 2 in or onto the supporting sleeve 1, the heat and pressure to which the rubber is subjected will effect displacement of a certain amount of the rubber material into the interstices of the fiberglass fabric, thus creating a mechanical bond or union between the two materials. Experiment with this idea proves that this is actually the case. Preferably, however, a chemical cement or bonding agent is also employed to enhance the bond of the rubber to the plastic and fiberglass sleeve, such bonding agent being shown at 6 in FIG. 3. A highly desirable cement or bonding agent for this purpose is sold by Lord Manufacturing Company under the trademark "Chemlock." Such a bonding agent has been conventionally used in the manufacture of bearings of the type previously referred to, comprising a metallic supporting sleeve, but when employed in connection with a non-metallic bearing as in the instant invention, the bonding agent penetrates through the fiberglass fabric to even a greater extent than does the rubber material itself, thus substantially increasing the area of the chemical bond. Accordingly, a combined mechanical and chemical bond is effected between the sleeve 1 and the resilient bearing sleeve 2, such bond being substantially stronger than bonds previously obtainable when metallic supporting sleeves were employed or when non-metallic supporting sleeves were used without a fabric reinforcement providing for intersticial interlocking of the bonding agent and the rubber material to the supporting sleeve.

Thus, the bearing assembly of the instant invention affords substantial advantages over bearings heretofore known in the art.

While the specific details of the invention have been herein shown and described, changes and alterations may be resorted to without departing from the spirit thereof as defined in the appended claims.

I claim:

1. A non-metallic bearing comprising concentric supporting and bearing sleeves, said supporting sleeve being composed of a plurality of layers of fiberglass fabric bonded into a unitary sleeve by a hardened plastic, said bearing sleeve being composed of a resilient material, means providing a mechanical interlock between said sleeves including a portion of said resilient material penetrating the interstices of at least one layer of said fiberglass fabric whereby to bond said sleeves together.

2. A non-metallic bearing comprising concentric supporting and bearing sleeves, said supporting sleeve being composed of a plurality of layers of fiberglass fabric bonded into a unitary sleeve by a hardened plastic, said bearing sleeve being composed of a resilient material, means providing a mechanical interlock between said sleeves including a bonding agent interposed between said sleeves, said bonding agent and a portion of said resilient material penetrating the interstices of at least one layer of said fiberglass fabric whereby to bond said sleeves together.

References Cited in the file of this patent

UNITED STATES PATENTS

| | | |
|---|---|---|
| 2,029,366 | Geyer | Feb. 4, 1936 |
| 2,248,761 | Kosatka | July 8, 1941 |
| 2,322,771 | Palm et al. | June 29, 1943 |
| 2,324,083 | Holmes | July 13, 1943 |
| 2,642,370 | Parsons et al. | June 16, 1953 |
| 2,768,925 | Fay | Oct. 30, 1956 |